A. CALLESON.
BOTTLE FILLING AND SEALING MACHINE.
APPLICATION FILED MAR. 30, 1916.

1,285,029.

Patented Nov. 19, 1918.
14 SHEETS—SHEET 4.

WITNESS
Wm. D. Bell

INVENTOR,
Amos Calleson
BY
John Steward,
ATTORNEY.

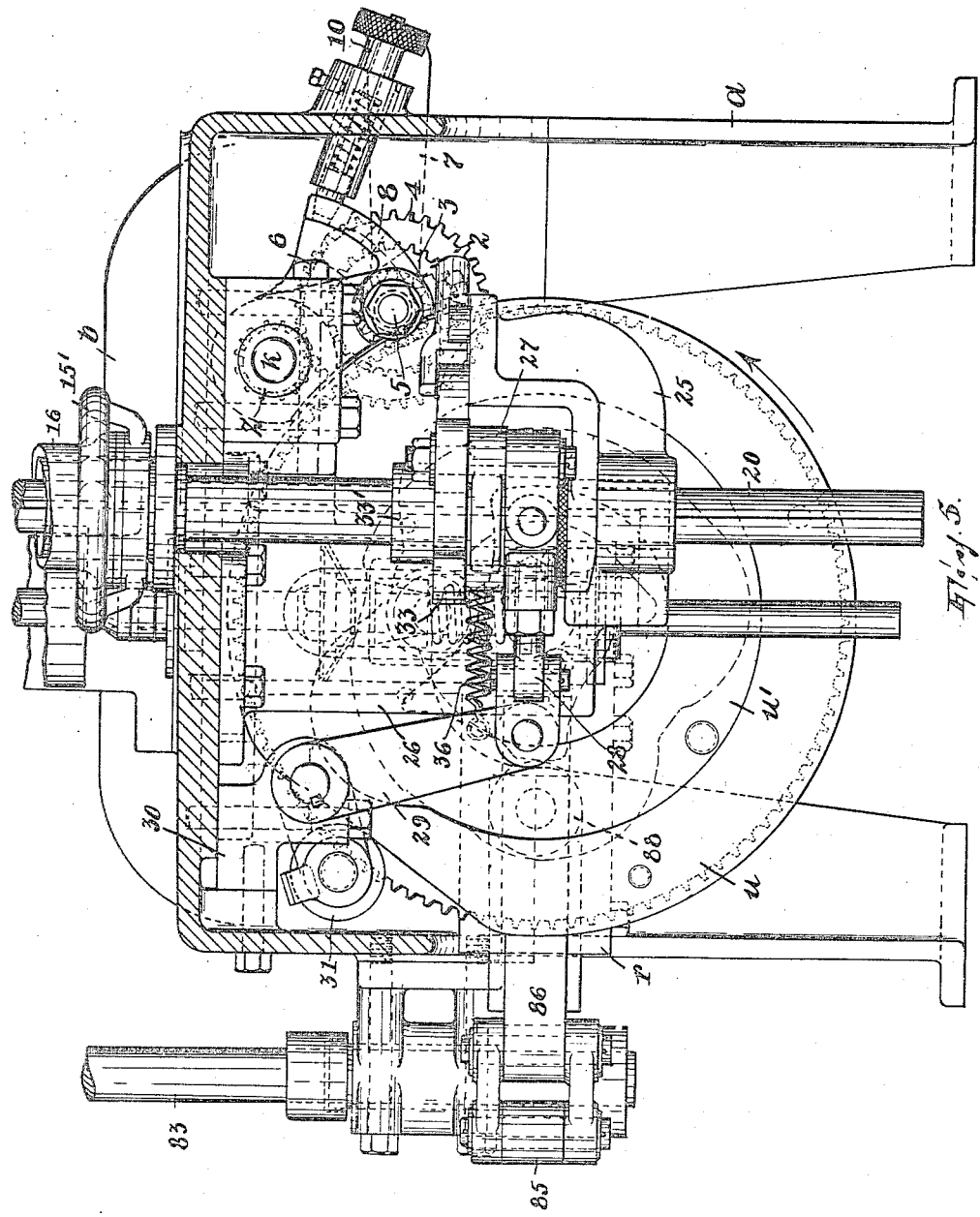

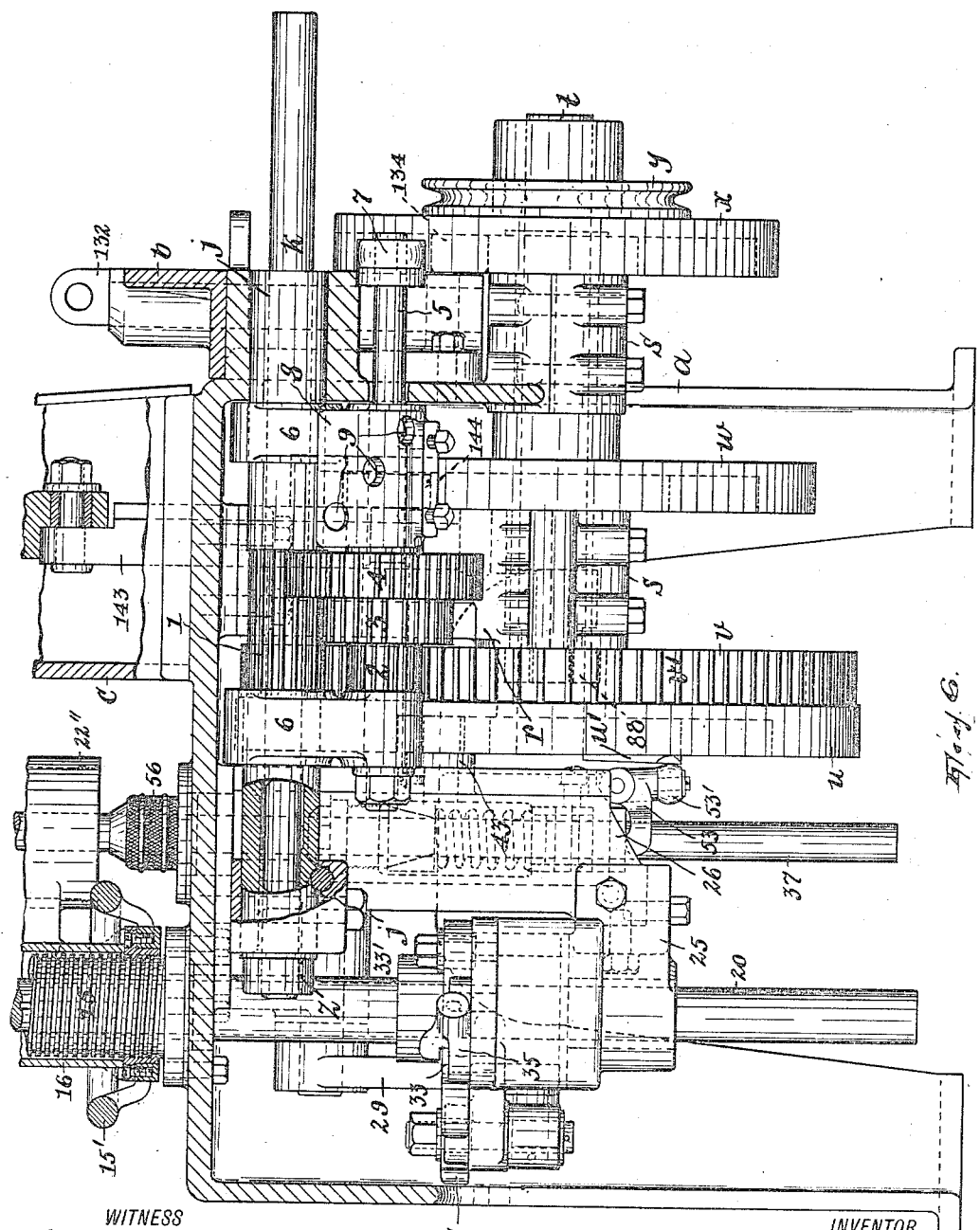

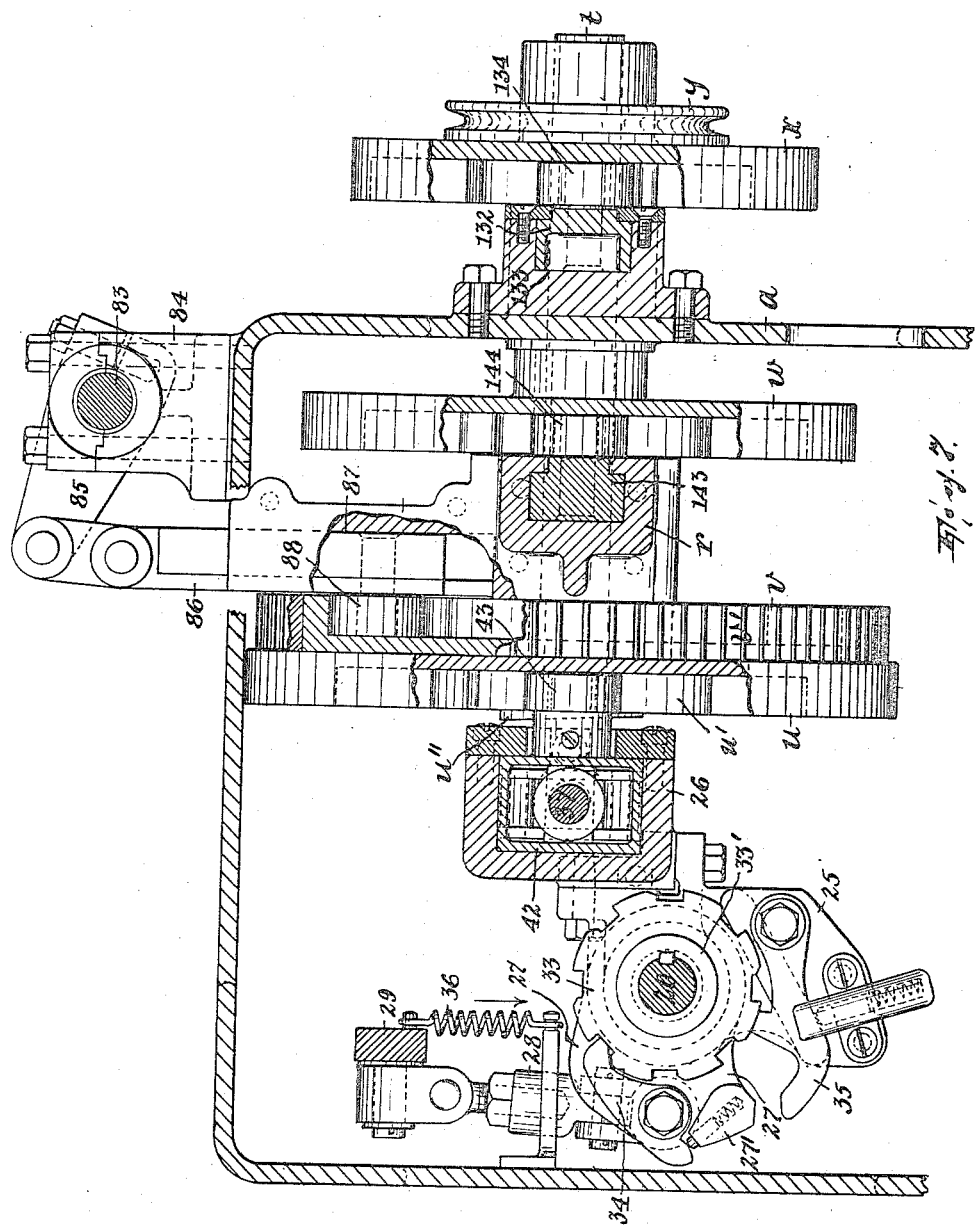

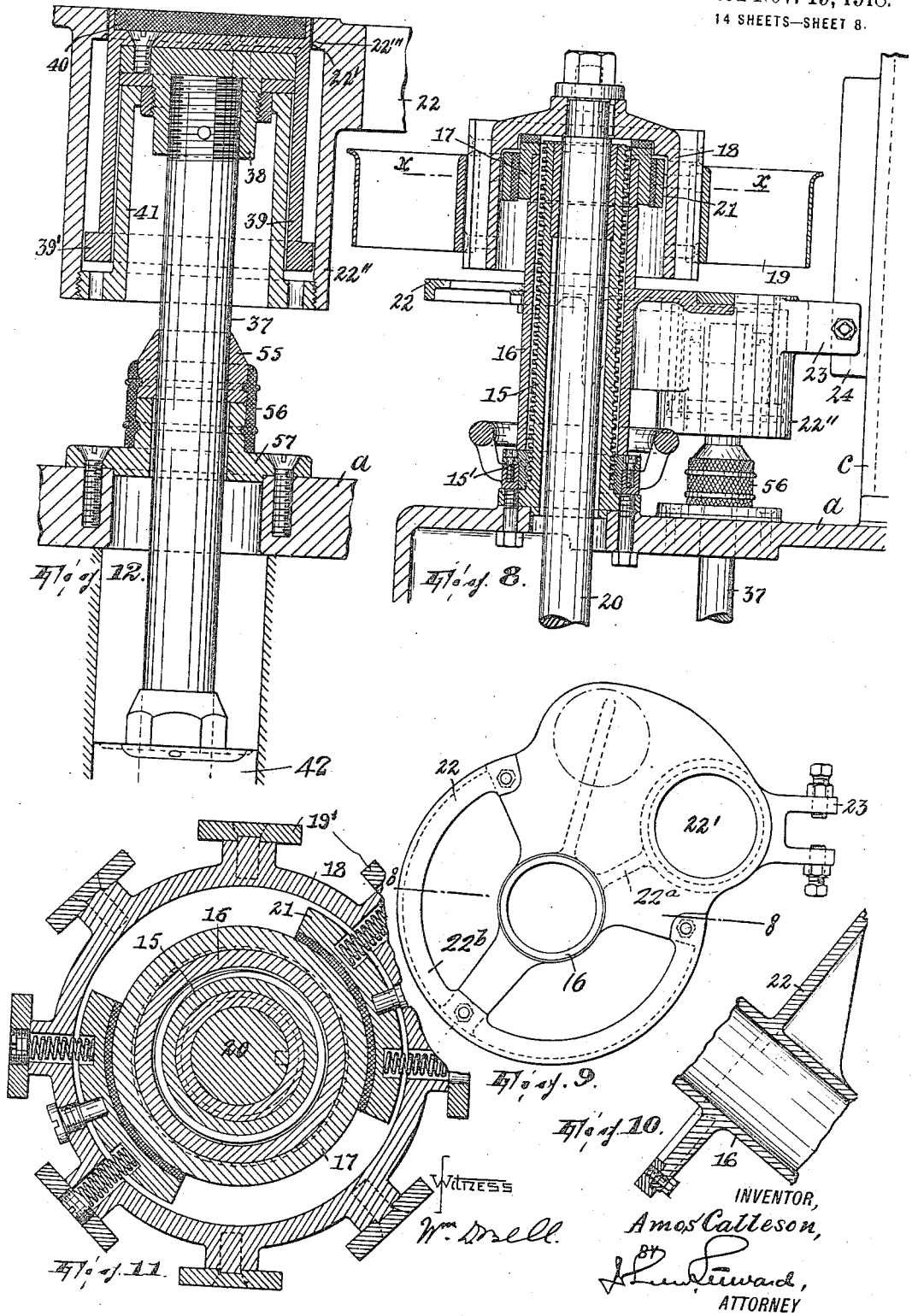

A. CALLESON.
BOTTLE FILLING AND SEALING MACHINE.
APPLICATION FILED MAR. 30, 1916.
1,285,029.
Patented Nov. 19, 1918.
14 SHEETS—SHEET 9.
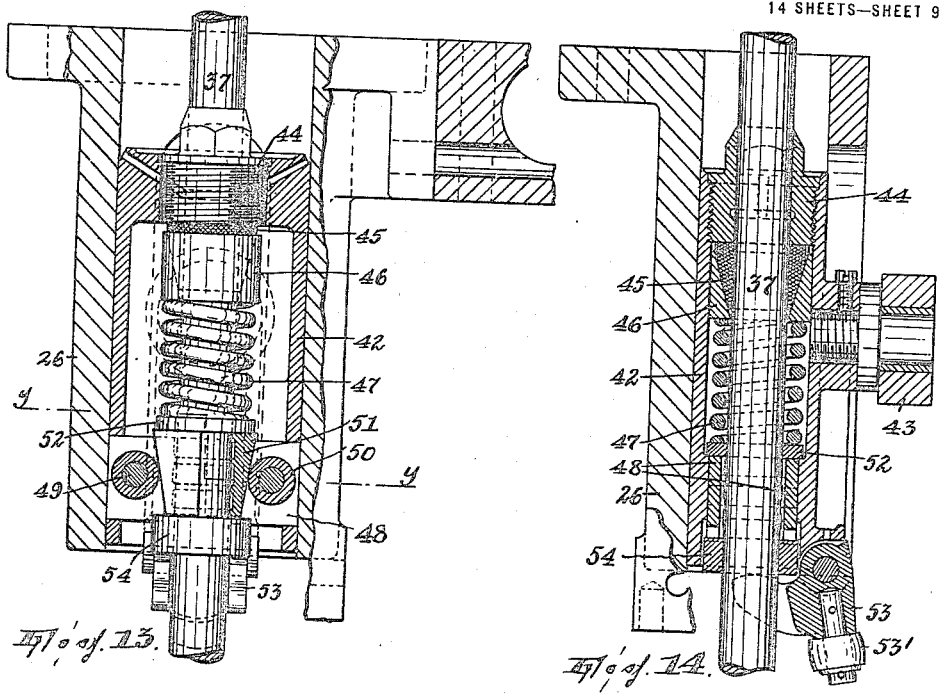
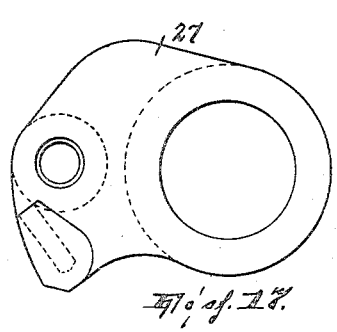
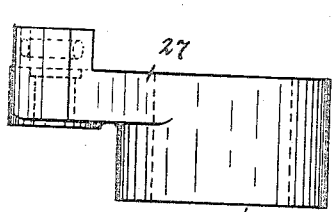
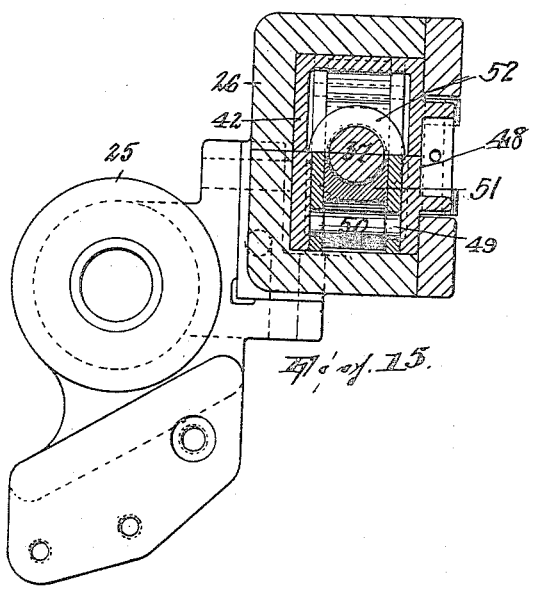
WITNESS
INVENTOR,
Amos Calleson,
BY
ATTORNEY.

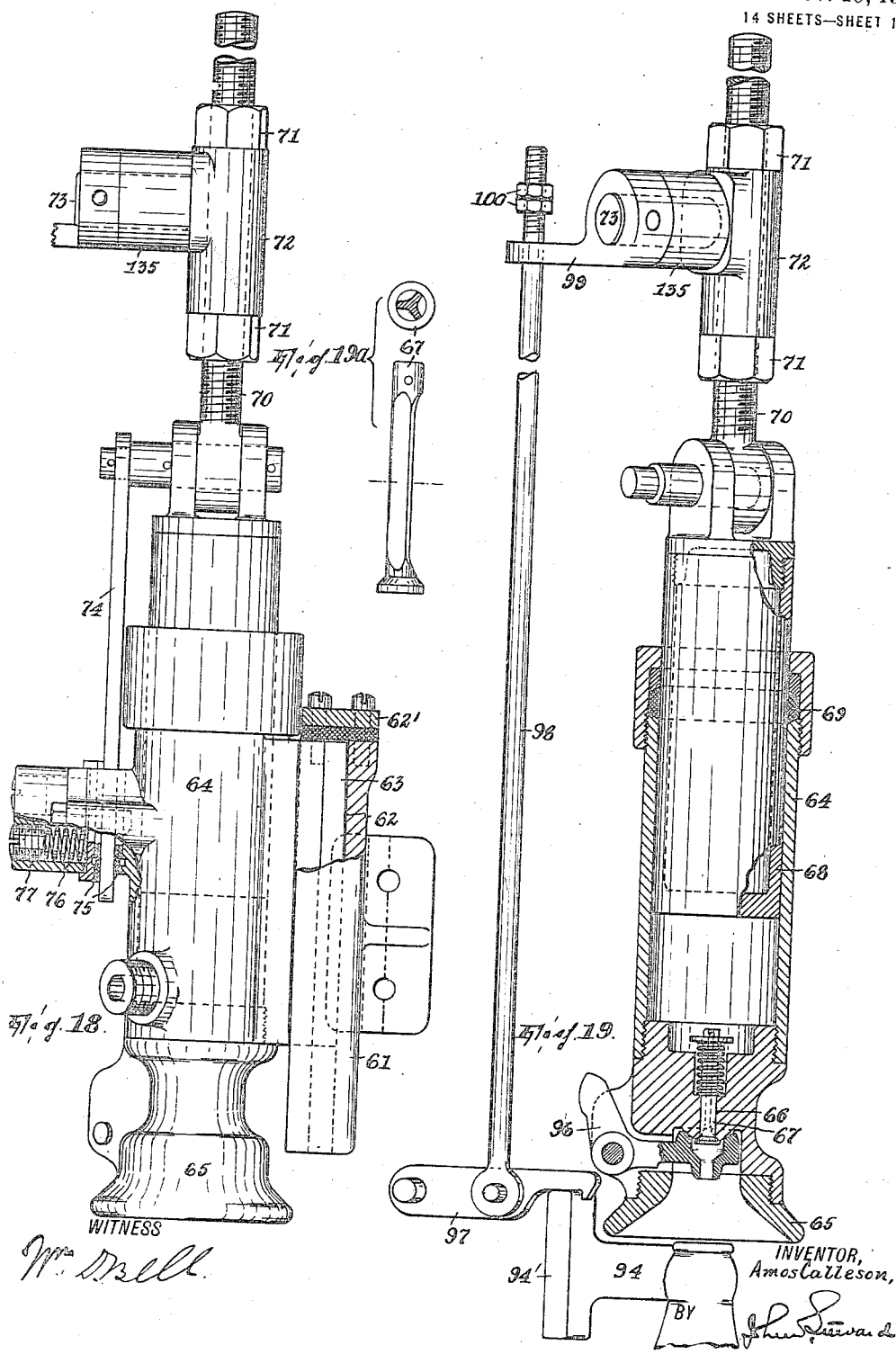

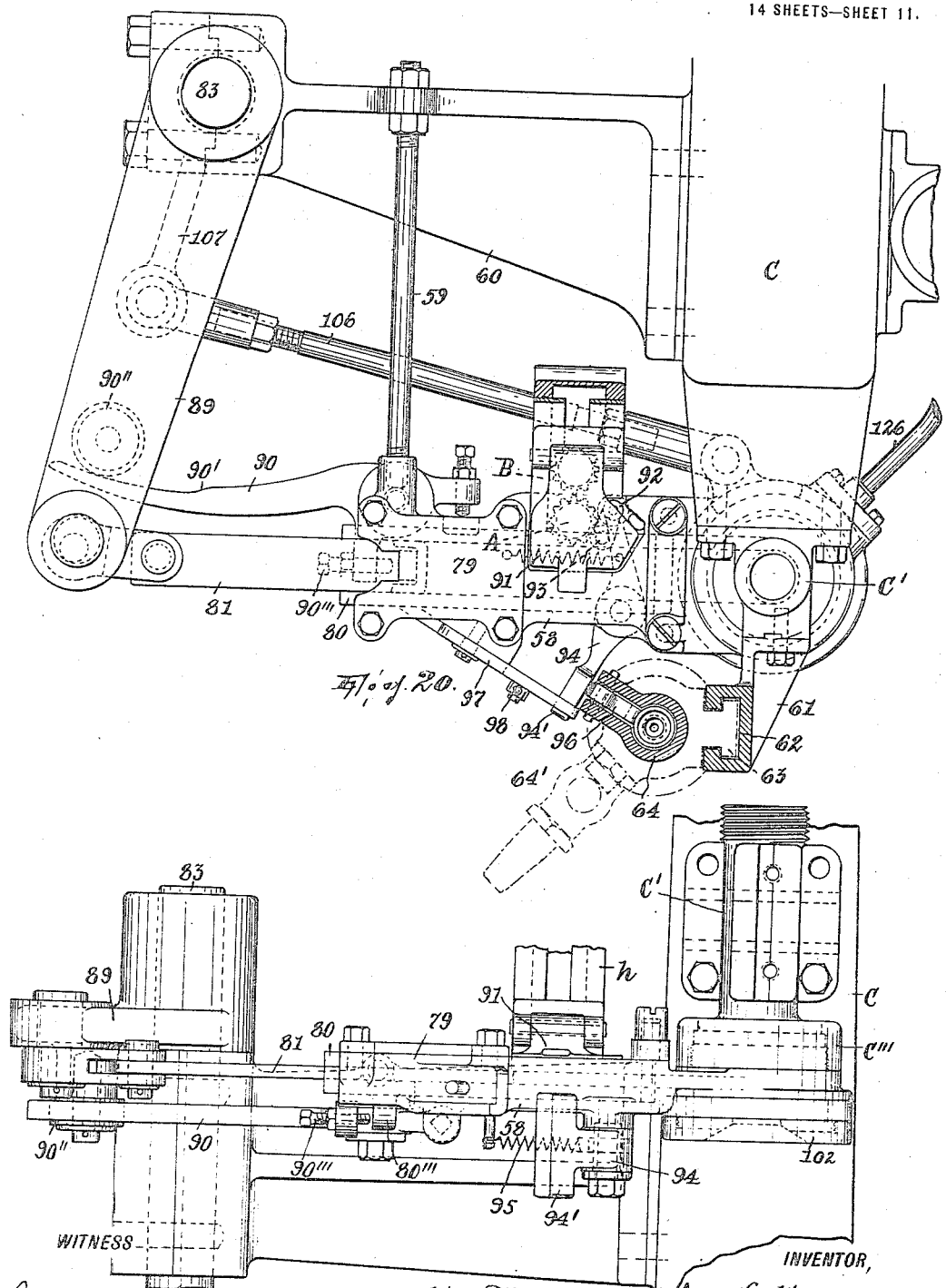

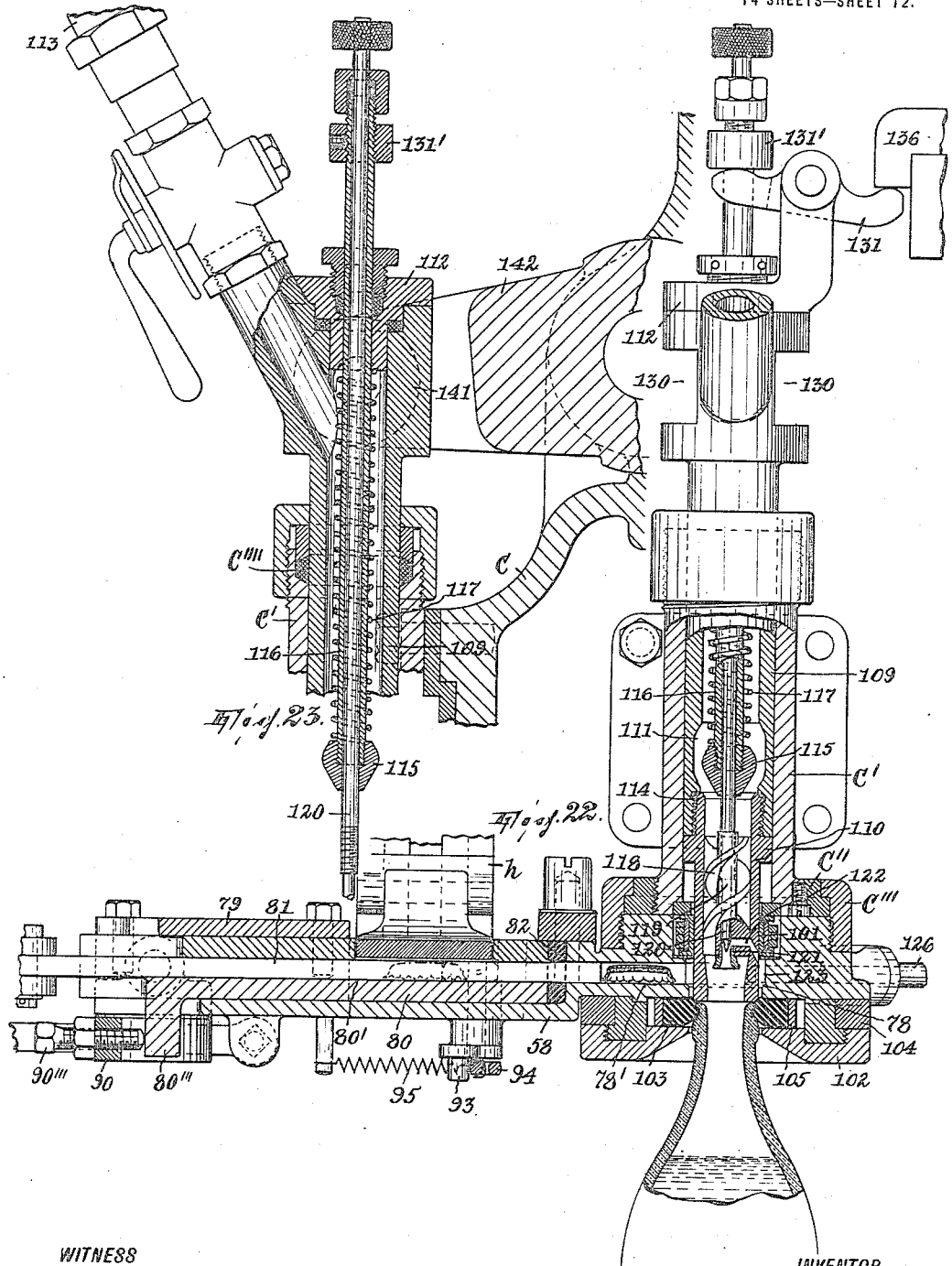

A. CALLESON.
BOTTLE FILLING AND SEALING MACHINE.
APPLICATION FILED MAR. 30, 1916.
1,285,029.
Patented Nov. 19, 1918.
14 SHEETS—SHEET 13.
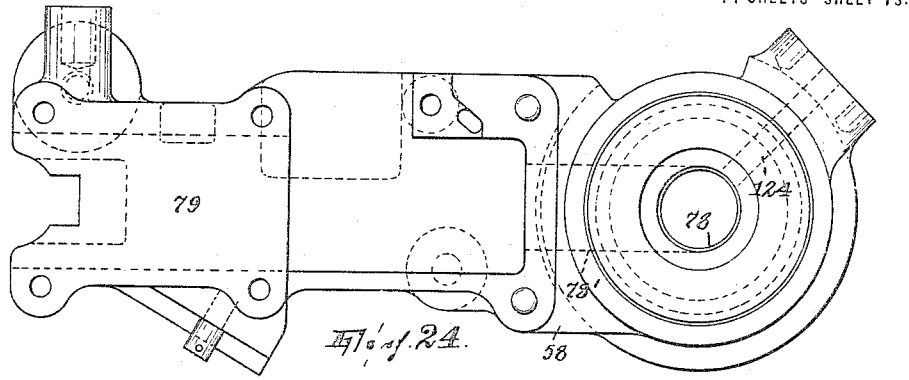
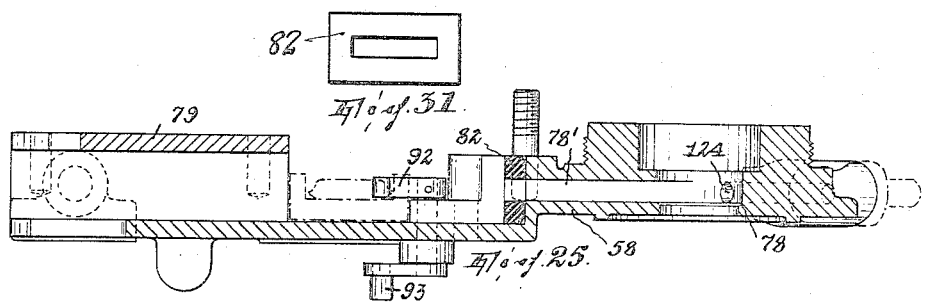
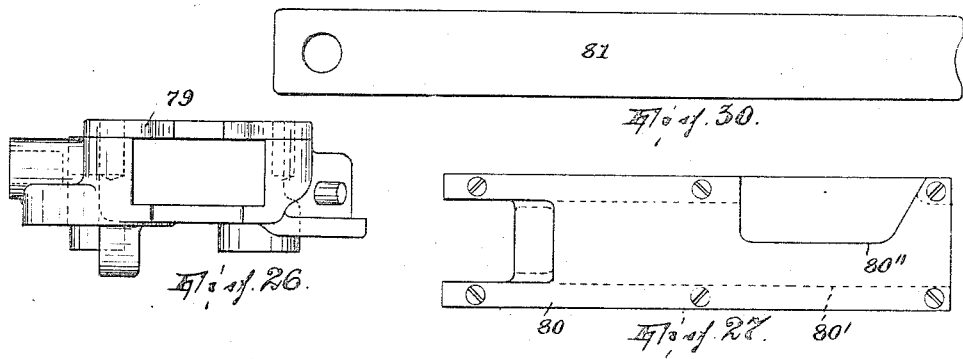
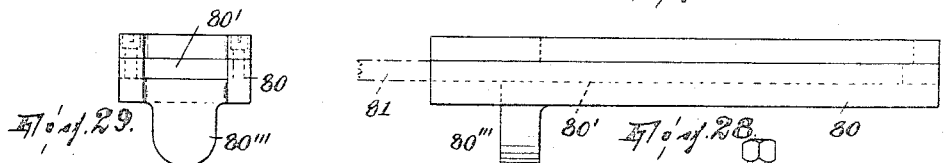
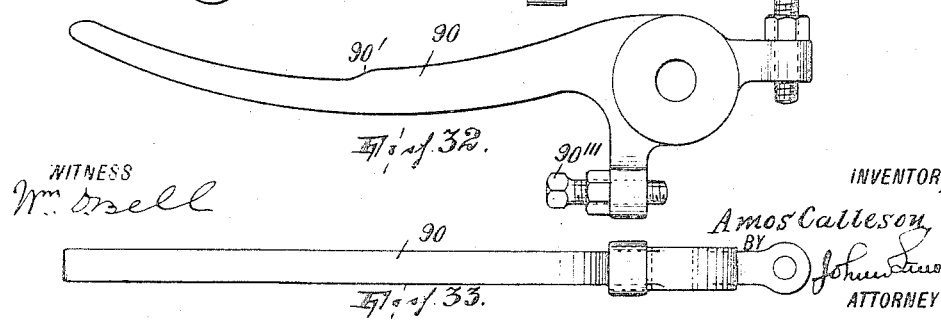

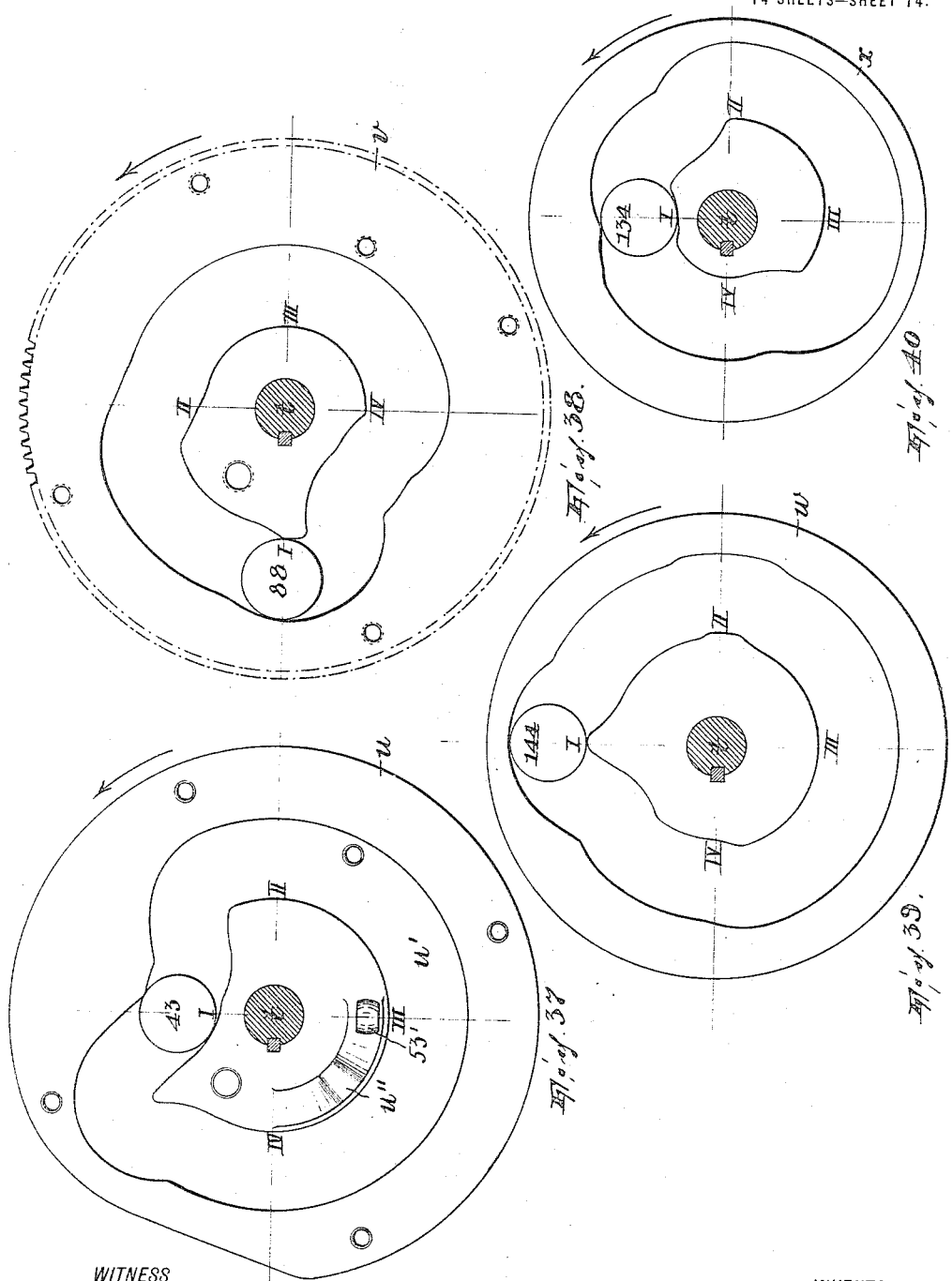

UNITED STATES PATENT OFFICE.

AMOS CALLESON, OF BROOKLYN, NEW YORK, ASSIGNOR TO ADRIANCE MACHINE WORKS, INC., OF BROOKLYN, NEW YORK, A CORPORATION OF NEW YORK.

BOTTLE FILLING AND SEALING MACHINE.

1,285,029.   Specification of Letters Patent.   Patented Nov. 19, 1918.

Application filed March 30, 1916.   Serial No. 87,804.

*To all whom it may concern:*

Be it known that I, AMOS CALLESON, a citizen of the United States, residing at Brooklyn, in the county of Kings and State of New York, have invented certain new and useful Improvements in Bottle Filling and Sealing Machines, of which the following is a specification.

The object of this invention is to provide a machine for filling and sealing containers, and particularly for filling bottles by first delivering thereto a charge of syrup or the like and then a charge of carbonating or other "filling" liquid and finally sealing the bottles, wherein these operations may be performed expeditiously, regardless of variations in the height of bottles assumed to be of standard height, with perfect results as to the product, and with the minimum of breakage of bottles, and which will not require any special skill on the part of the operator beyond that necessary for supplying the bottles to and removing them from the machine and effecting certain simple adjustments whenever changes are required in order to make the machine adapted to operate on bottles of different standard sizes.

The invention will be found fully illustrated in the accompanying drawings, wherein:

Fig. 5 is a vertical sectional view of the lower portion of the machine in a transverse plane through the shaft 20, looking rearward in Fig. 4; and Fig. 5ª shows a detail of Fig. 5;

Fig. 6 is a front to rear vertical sectional view of the lower portion of the machine in a plane substantially coincident with the main shaft and looking toward the left in Fig. 5;

Fig. 7 is a horizontal sectional view through the base portion of the machine in a plane just below the main shaft;

Fig. 8 is a vertical sectional detail in a plane at right angles to that of Fig. 5, illustrating the upper part of the bottle-feeding means and the means to support the bottles while being operated upon, the line of section of the latter means being indicated at 8—8 in Fig. 9.

Figs. 9 and 10 are a plan and a sectional view of the fixed bottle supporting means shown in Fig. 8;

Fig. 11 is a sectional view on line x—x of Fig. 8;

Fig. 12 is a sectional view of the upper part, and Figs. 13 and 14 sectional views, at right angles to each other of the lower part, of the bottle elevating means shown partly in Fig. 8;

Fig. 15 is a sectional view on line y—y of Fig. 13;

Figs. 16 and 17 are views of a lever 27 in the bottle feeding means;

Figs. 18 and 19 are a front elevation, partly broken away, and a vertical sectional view of the syrup dispenser and Fig. 19ª shows a detail thereof;

Fig. 20 is a plan, partly in section, of the syrup dispensing, bottle filling and sealing and closure feeding means, and Fig. 21 a front elevation thereof;

Figs. 22 and 23 are vertical sectional detail views, in planes at right angles to each other, of the filling and sealing and closure feeding means;

Figs. 24 to 33 show details of the last-named means concerned in the closure feeding;

Fig. 36 is a sectional detail, illustrating the snifting means; and,

Figs. 37, 38, 39 and 40 show the cams and corresponding rollers at the start of a cycle of the operation of the machine.

Figure 1:
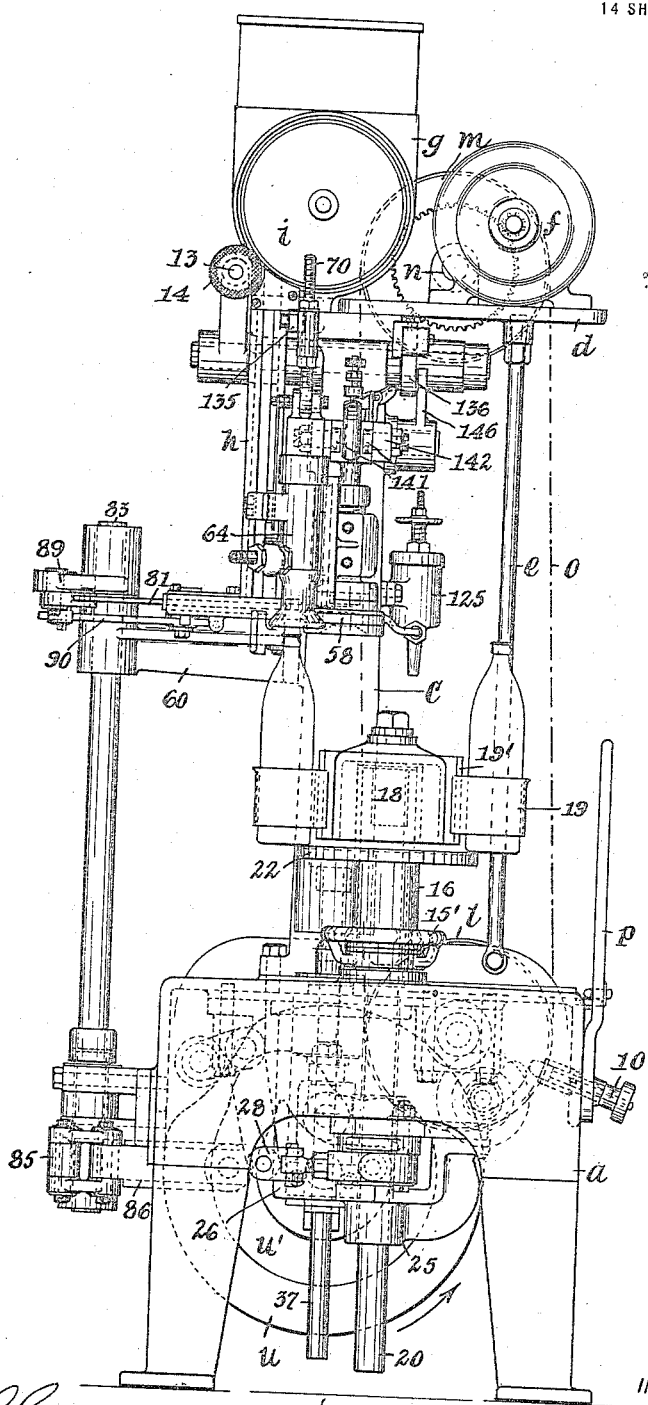
Figures 1, 2 and 3 are front, side and rear elevations of the machine, and Fig. 3ª a detail view showing a bracket forming a part of the frame.

The frame of the machine includes a base $a$ having a bracket $b$ (Fig. 3ª) projecting rearwardly therefrom, a pedestal $c$ (Figs. 2, 36 and 4) upstanding from the base, and a bracket $d$ surmounting the pedestal and braced by the rod $e$.

In the machine as shown in the drawings the power is furnished by an electric motor $f$ supported on the bracket $d$; said bracket also carries the closure supply hopper $g$ having the depending delivery chute $h$ and a rotary means, as $i$, for causing the closures to be delivered, properly faced, to said chute.

Figure 2:
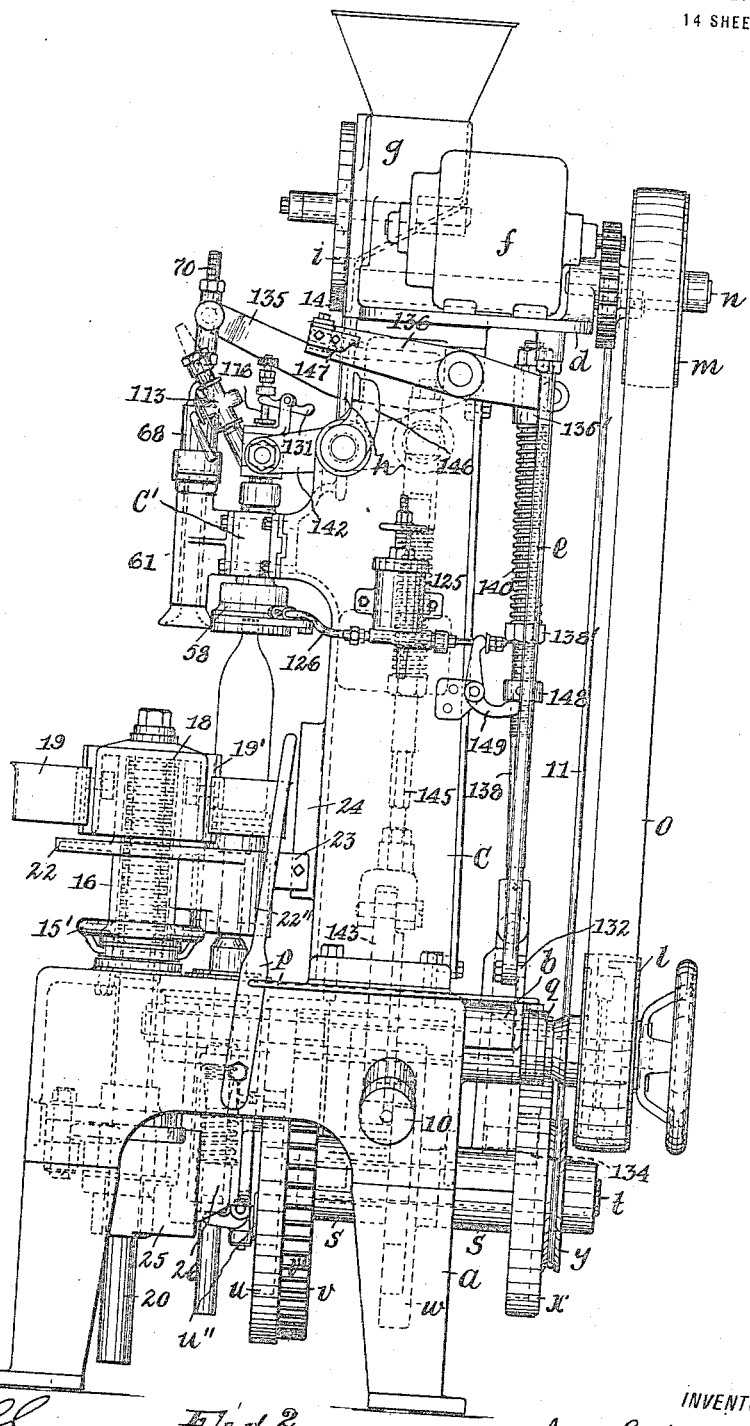

In fixed alined sleeves $j$ in the base $a$ (Fig. 6) is journaled the main shaft $k$. Pulleys $l$ and $m$ on this shaft and a countershaft $n$ suitably driven from the motor shaft receive a belt $o$; for controlling the power transmission means thus afforded, i. e., for starting and stopping the machine, there is provided the manually operated means $p$ including any suitable clutch $q$ for rendering the pulley $l$ fast or loose on shaft $k$ (Fig. 2).

A bracket $r$ (Fig. 5, 6, 7, 34 and 35) depends from the table forming the top of the base $a$ and in bearings $s$ bolted thereto and to the rear of the base is journaled the camshaft $t$ carrying four cam disks $u$, $v$, $w$ and $x$ and a pulley $y$, the periphery of the disk $v$ being toothed to make of it a gear wheel $v'$. The cam-shaft may be driven from the main shaft at variable speeds as follows (Fig. 6): On the main shaft, which is held against longitudinal movement by the aforementioned pulley and clutch $l$ and $q$ on its rear end and a collar $z$ on its fore end, is a broad pinion 1 with which the largest of three graduated pinions 2, 3 and 4, rotating as a unit, meshes; the pinion member 2—3—4 is journaled on the shaft 5 of a bracket which comprises with said shaft two arms 6 in which the shaft is rigid and which are pivotally hung from and slidable longitudinally on the sleeves $j$, said bracket also including a handle 7, rigidly mounted on the shaft, and an arc-shaped plate 8, fixed to one of the arms and having holes 9 to receive a spring-pin 10 arranged in the base $a$, the arrangement being such that upon shifting the bracket laterally and on sleeves $j$ as an axis until the spring-pin engages in one of said holes one or the other of the pinions 2, 3, 4 will be in mesh with the gear wheel $v'$ (see Figs. 5 and 6). A belt 11, passed around pulley $y$ and a pulley 12 on a suitably supported shaft 13 in the head of the machine (Figs. 1 and 3) and carrying a friction wheel 14 peripherally engaging the means $i$, is employed to transmit power to said means $i$.

The bottles fed to the machine by the attendant, are successively and automatically positioned first for receiving the syrup charge and second for receiving the carbonated liquid charge, or "filling," and being sealed, whereupon they are brought to the position for removal. Each bottle comes to a standstill in the present case for receiving its syrup charge and for filling and sealing, and to that end the feeding or advance of the bottles is intermittent or step by step. Provision is made for vertical adjustment of the means to support the bottles while undergoing the syrup dispensing and filling and sealing operations, so that bottles of different standard heights may be operated upon; also for compensation during the filling and sealing operation for bottles varying in height which are supposed to be of standard height, and for certain vertical movement of each bottle preliminary to filling and sealing. The mechanism employed to these ends will now be described:

There is bolted to the table of base $a$ an upstanding externally threaded pillar 15 (Fig. 8) on which is a hand-nut 15′ which supports, and on being turned raises or lowers, a sleeve 16 whose head 17 (shrunk thereon) is surmounted by the bell-shaped center-part 18 of the bottle feeding turret which includes the cylindrical bottle holders 19, freely slidable on vertical ways 19′ of the centerpart and has depending from and keyed to it the vertical shaft 20. The turret, through shaft 20, is rotated step by step, as will appear, subject, however, to the friction grip of the arc-shaped spring-pressed friction-pads 21 (Fig. 11) interposed between its bell-shaped center-part and the head 17 of sleeve 16. Immediately below the turret the sleeve 16 has a bottle rest 22 (Figs. 8 and 9) having a fork 23 to engage a rib 24 on the pedestal $c$ and so prevent the rest and sleeve from turning, while permitting their vertical adjustment by means of the nut 15′; the bottle rest 22 comprises two parts, one integral with the sleeve 16 and having a web 22$^a$ joining said sleeve and the hereinafter mentioned boss 22″, and the other, 22$^b$, being part-circular and suitably secured to the first-named part. The bottles being advanced by the turret slide over the rest with their bottoms thereon (Fig. 1), excepting at the filling and sealing position, where the rest is formed with an opening 22′, Fig. 12, (through which means for elevating the bottles moves) and with a depending boss 22″.

The step by step movement of the turret is derived from the cam $u$ by the following means: The shaft 20 is journaled in an arm 25 projecting from a guide 26 depending from the table (Figs. 5, 6, 7, and 13 to 15) and fulcrumed concentrically with the shaft is a lever 27 (Figs. 16 and 17) which is connected, by the universal connection 28, with the long arm of a bell-crank lever 29 fulcrumed in a bracket 30 bolted to the table and having a roll 31 on its short arm (held thereon by the removable clip 32, Fig. 5$^a$, so that it may be replaced by a new one when worn) bearing against the periphery of the cam $u$. Superimposed on lever 27 is a ratchet wheel 33 whose hub 33′ is splined (Fig. 7) to the shaft 20. A spring-pressed pawl 34 is pivoted to the lever and serves in the oscillation thereof to rotatably advance the ratchet wheel and consequently shaft 20; 35 is a spring-pressed holding pawl which locks the ratchet against rotary movement in the backward movements of pawl 34, being disengaged from the ratchet wheel by a toe 27′ on the lever 27 at the moment when the pawl 34 is at its rearward limit and about to begin its advance. For imparting movement to the parts 27, 28 and 29 counterwise to that imparted by the cam $u$ I provide the spring 36 connecting the lever 29 with a fixed part of the frame of the machine.

The means for elevating the bottles at the filling and sealing position and for compensating for variations in their height is best shown in Figs. 6, 7, 8 and 12 to 15, 37 is a vertical spindle on the upper end of which is screwed a cap 38 (Fig. 12) to which is suitably secured a bell-shaped head 39 or bottle seat equipped with an elastic bottle pad 40. The head 39 occupies telescoped relation to the boss 22″ of the rest 22 and to the sleeve 41 which is screwed into said boss 22″ from below and projects up into the head 39; in the rise or fall of the plunger including parts 37 to 40 its movement is under certain conditions having to do with the compensation positively limited on the one hand by contact of the flange 39′ of head 39 with the flange 22‴ on the boss 22 and on the other by contact of the cap 38 with the upper end of the sleeve 41. In the guide 26 moves a slide 42 containing certain mechanism adapting it as a carrier for the bottle supporting structure just referred to and having a roll 43 which runs in a groove $u'$ in the left hand face of the disk $u$. Screwed into the top of the slide 42 is a nut 44 abutted by a tapered plug 45 of leather or other friction-grip material which fits the tapered bore of a collar 46 which under the upward pressure of a spiral spring 47 acts to contract said leather plug into gripping relation to the spindle 37, which penetrates these several parts. Rigid in the slide, as by being set at their ends in opposite sides thereof (Fig. 13), is a pair of spaced plates 48 joined by pins 49, one on each side of the spindle, forming bearings for rolls 50. Between the rolls and penetrated by the spindle is a downwardly tapered hardened split wedge or cone 51 surmounted by a washer 52 against which spring 47 bears; the inside of the wedge is ribbed transversely, as shown in Fig. 13, and when the spring is free to force it downwardly to the limit the rolls and spindle will allow its grip on the spindle is substantially positive. At the lower end of the slide 42 is pivoted a lever 53 one arm of which underlies a washer 54 beneath the wedge and penetrated by the spindle and the other arm of which carries a roller 53′ which at a certain point in each cycle of the machine is engaged by a cam $u''$ on the side of disk $u$ (Figs. 2 and 7). Fig. 13 shows the wedge elevated slightly by the lever 53, so that the wedge is inactive to grip the spindle and the slide is capable of slipping on the spindle, subject, however, to the friction exerted by the friction plug 45; Fig. 14 shows the lever retracted and the wedge therefore positively locking the slide to the spindle. For preventing broken glass and liquids from having access to the mechanism of the slide there is snugly arranged on the spindle above the table of the base $a$ a tapered wiper sleeve 55 held by an elastic sleeve 56, embracing the same and the upstanding boss of a plate 57 fixed to said table and covering the opening therein through which the spindle projects, the yielding nature of the sleeve 56 allowing the wiper sleeve to shift laterally with the spindle which, it will be noted, is allowed slight lateral play as to its upper portion (by flexing) before actually contacting with any of the parts with reference to which it has thrust movement (22″, 41 and 57), the idea being to eliminate all frictional resistance to the working thrust of the spindle excepting what is predetermined, i. e., by adjusting nut 44 and consequently altering the tension of the spring 47.

From the foregoing it will be seen that during the step by step advance of the bottles upon and around the bottle rest 22, accomplished by the intermittent advance of the bottle holding turret, each bottle comes to rest upon the elastic pad 40 of the bottle elevating means, and that during a pause in such advance said elevating means is raised, in connection with the filling of the bottle with the carbonated liquid charge and the sealing of the bottle, and then depressed, leaving the bottle to continue its step by step advance over the rest 22.

To the front of the pedestal $c$ is bolted a vertical sleeve $c'$ to which is secured by the threaded rings $c''$ and $c'''$ the right hand end of a casting 58 (Figs. 20, 22, 24 and 25), held rigid by a brace 59 which connects the casting with an arm 60 projecting laterally from the pedestal. Formed with or rigidly secured to sleeve $c'$ is a bracket 61 (Figs. 2, 18 and 20) having a vertical T-shaped guideway 62 in which slides the T-shaped rib or projection 63 of a cylinder 64 (Figs. 18 and 19) having a flaring bottle receiving mouth 65 and its port 66, delivering to said mouth, normally closed by a spring-pressed valve 67 (Figs. 19 and 19ᵃ). In the cylinder is a piston 68 (the joint between which and the cylinder is made tight by the gland 69) having connected to its upper end an eyebolt 70 on which, held between nuts 71, is a shackle 72 having a projecting pin 73. The parts now being described form the syrup dispenser. Upward movement of the projection 63 in the guideway 62 is limited by the stop 62′ (Fig. 18). Syrup is supplied to the cylinder 64 from any suitable source through its nozzle 64′ (Fig. 20) having an inwardly opening check valve (not shown). The syrup dispenser is reciprocated by means (to be described) connected with the pin 73 of the shackle. On the downward stroke, the mouth-piece 65 of the cylinder comes against the head of a bottle on the rest 22 and stops, the piston continuing downward and so forcing a charge of syrup into the bottle; on the upward stroke, the rib or projection 63 comes against the stop 62' so that the upward progress of the cylinder is checked and the piston continuing upward, a fresh quantity of syrup is drawn into the cylinder. Assuming that the means for reciprocating the shackle 72 has a predetermined extent of movement and that the descending dispenser always meets the bottle head at approximately the same level, it will be obvious that to adjust the eyebolt downwardly in the shackle is to increase the amount of syrup discharged, and that to adjust the eyebolt upwardly in the shackle is to decrease the quantity of syrup discharged. This adjustment makes it possible to vary the quantity of syrup discharged in proportion to the capacity standard of the bottles being filled, whose heads, according to the height standard of the bottles are brought to the proper level by vertical adjustment of the rest 22. To impose frictional resistance to relative movement as between the piston and cylinder I attach to a suitable part of the piston a rod 74 which is gripped between the friction-pieces 75 one of which is movably mounted and backed by the spring 76 in turn backed by the adjusting screw 77 (Fig. 18). It will be noted that if no bottle is present the downward movement of the cylinder will not be checked, and consequently the syrup charge will remain undelivered.

The casting 58 has at the right-hand end a vertical opening which at 78 forms a seat for a bottle cap or "crown". Its left-hand portion forms a box or casing 79 in which a block 80 has slight lateral movement, in which in turn slides the slide 81, the block 80 being formed with a longitudinal passage 80' receiving the slide 81, and the casting 58 having a passage 78' which alines with the passage 80' and terminates at the closure seat 78. The closure chute h terminates at its lower end at the back of and is suitably attached to the casting 58 opposite an opening 80'' in the block 80. The slide being reciprocated, on each left-hand stroke a cap is forced by the weight of those behind it into the passage 80' of the block, whereupon the slide moves to the right and shoves the cap through passage 78' toward the bottle seat 78. Opposite the right-hand end of the block there is set in the casting a rubber gasket 82 (Fig. 31) which, as will appear, forms part of the means for sealing off from the atmosphere at a certain stage in the operation a space which includes the opening in which the seat 78 is formed. The movements of the slide 81 are accomplished thus: A rock-shaft 83 is journaled in the arm 60 and in brackets 84 (Fig. 7) projecting from the left side of the frame. Its lower end carries a crank 85 suitably connected with a slide 86 which travels in a horizontal guideway 87 (Figs. 34 and 35) of the bracket r and which has a roller 88 (Fig. 7) engaging the groove forming the camway in the right-hand face of the cam disk v. The upper end of the shaft carries a crank 89 (Figs. 1, 4 and 20) which is suitably connected with the slide 81. For imparting the slight movement to the block 80 necessary to form the aforementioned seal at the gasket 82 there is fulcrumed to the casting a lever 90 having a cam-face 90' non-concentric with respect to the axis of shaft 83 and against which bears a roller 90'' on the lever 90, said lever having a set screw 90''' to impinge against a lug 80''' depending from the block 80. 91 is simply a pivoted cover for the recess 80'' in the block, permitting manual access to the delivery end of the chute h.

Whenever it happens that a bottle fails to be presented to the syrup dispenser it is desirable that there should be absence of a crown or cap at the seat 78 at the moment when the bottle would have been presented for the sealing operation at the seat. A gate 92 is pivoted to the casting 58 and has on its forward end a pin 93 adapted to be engaged by one arm of a lever 94 also pivoted to the casting and having its forward arm pulled to the right in Fig. 20 by a spring 95; the spring holds the gate in obstructing relation to the delivery end of the chute, and when the lever is moved counter to the spring the weight of the caps in the chute swings the gate aside to allow the lowermost cap to enter the passage 80' in block 80. A container controlled detector lever 96 is pivoted to the cylinder 64 of the syrup dispenser and has one arm projecting into the mouth-piece 65 and apertured for the passage of the liquid (Fig. 19) and the other arm adapted to impinge the head 94' (Figs. 19, 20 and 21) of the lever 94. A latch 97 is pivoted to the casting and adapted to engage the head 94' of lever 94 to hold it, against the tension of its spring, in the position shown in Figs. 19 and 20; connected with this latch is a pitman 98 which freely penetrates an arm 99 projecting from the pin 73 and having adjustable nuts 100 screwed on its upper end above said arm. In the normal position of the lever its head is unengaged by the latch and held (by the spring 95) to the right. When the syrup dispenser descends, if no bottle is present, the detector lever 96 (which, if not already standing with its apertured end depressed will assume that position as soon as its other end comes against the head 94' of the lever) will not actuate lever 94, and consequently no cap will be delivered to the passage 80'; if a bottle is present when the syrup dispenser descends the bottle head will cause the detector lever to swing on its fulcrum, so that it will push lever 94 against the tension of its spring until it is caught by the latch 97, being held in that position until, a cap having been delivered to the passage 80', the slide 81 can effect the placement of the cap at the seat 78, whereupon, on the subsequent rise of the syrup dispenser, the arm 99 impinges the nuts 100 and, elevating the pitman 98, causes the latch to release lever 94 so that the gate 92 again comes into obstructing relation to the cap chute.

The right-hand end-portion of the casting 58 has the hole thereof which, as aforesaid is formed with closure seat or ledge 78, alined with the bore of sleeve c', and said hole and bore are formed with a continuous recess in which is seated the sealing throat 101 of, say, the type illustrated in Letters Patent 1,078,607. Against the lower face of the casting is held, by the mouth-piece 102, the rubber gasket 103 which is adapted to be contracted by any suitable means, say from a cam-ring 104 held in place by the mouth-piece and which, when turned, forces radially inwardly against the gasket the cam-blocks 105, substantially as explained in Letters Patent No. 725,531. An arm of the cam-ring is connected by the pitman 106 with the crank 107 on the shaft 83 (Fig. 20), so that in the turning movement of shaft 83 when gasket 82 is compressed the gasket 103 is contracted into gripping and sealing relation to the mouth of the bottle, entered previously thereinto (Fig. 22).

In sleeve c' is a hollow spindle or plunger comprising an upper section 109 and a lower section 110 joined by screw threading, said spindle being slidable vertically in the sleeve and having its port 111 open downwardly but closed at the top by the plug 112 and communicating with a suitable supply of the filling liquid by a tubular connection 113. Port 111 affords at 114 a valve seat against which seats a valve 115 carried by the lower end of the tubular stem 116, which protrudes upwardly through plug 112, a spiral spring 117 coiled about the stem and interposed between the valve and said plug serving to press the valve against its seat and so close port 111. The section 110 of the spindle has a screw 118 therein whose axial portion 119 (coaxial with said section) is a tube receiving the lower end of a rod 120 which extends upwardly through and protrudes from the stem 116 and has its lower end tapered to form a reducing valve obturating the valve seat 121 in the bore of the tube 119; by adjusting the rod up or down the aperture formed by its tapered lower end and seat 121 may be more or less restricted for obtaining the desired degree of retardation of flow through the port comprising the lower part of the bore of tube 119 and a passage 122 leading from said bore laterally to the exterior of spindle section 110. Immediately above the gasket 103 the aforesaid hole affording the closure seat 78 forms a chamber 123 of but slightly greater internal diameter than the external diameter of the section 110 of the spindle, and outwardly from the chamber leads a port 124 (Fig. 25) which is connected with a receiver 125 (Figs. 1, 2 and 36) by the tubular connection 126. The receiver contains an adjustable piston 127 for varying its capacity and it has a discharge outlet 128 controlled by a valve 129 that is normally spring-held in closed position, being opened at the proper time to allow the receiver's contents to escape through outlet 128. The upper end of the spindle section 109 has opposite horizontal ways 130 and its plug 112 carries a lever 131 for engaging a collar 131' fixed on stem 116 and so raising the stem to open valve 115, c'''' is a gland in sleeve c' around spindle 109—110 (Figs. 22 and 23).

Figure 3:
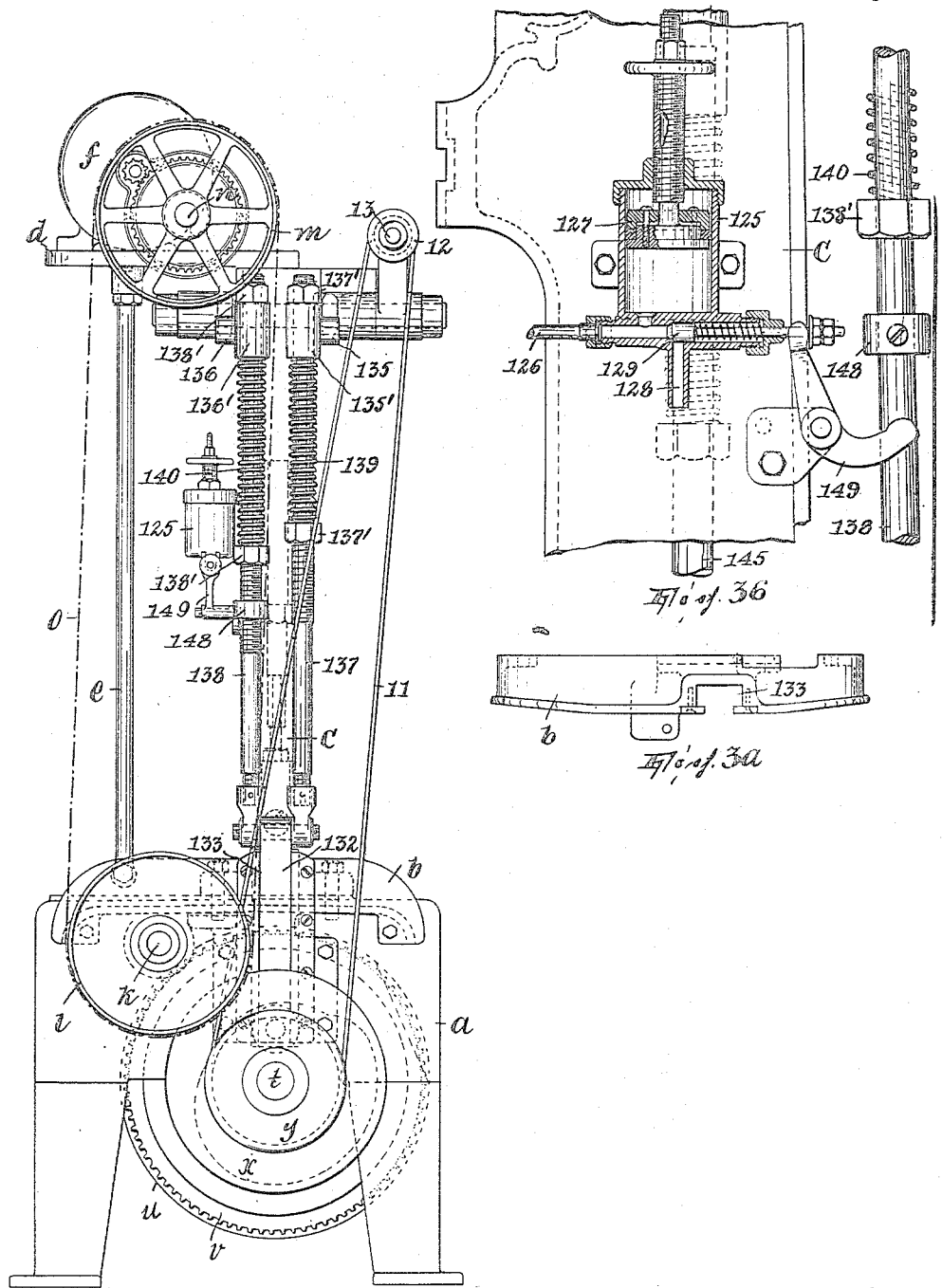
Figure 4:
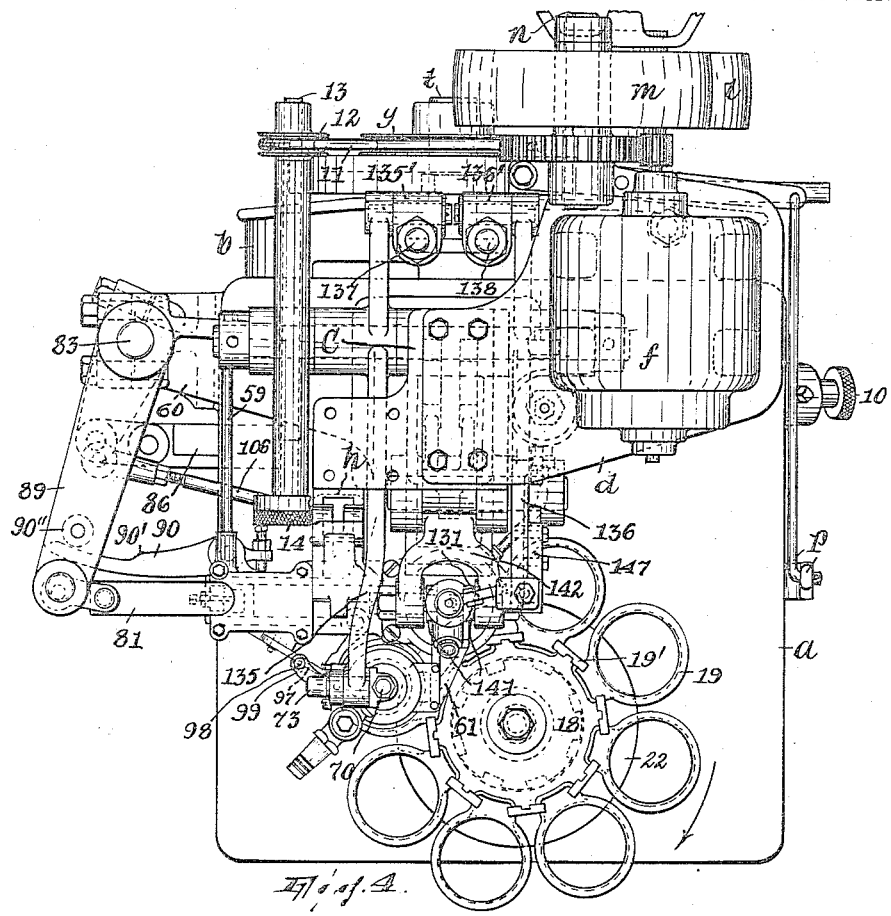
Fig. 4 is a plan.
Figure 34:
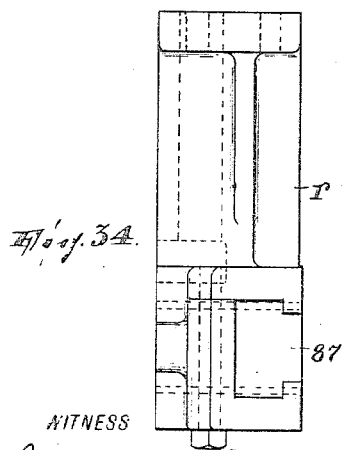
Figs. 34 and 35 are a side and front elevation of the bracket r in which the cam shaft has partial support and the mechanism for transmitting power to said last-named means is in part supported.
Figure 35:
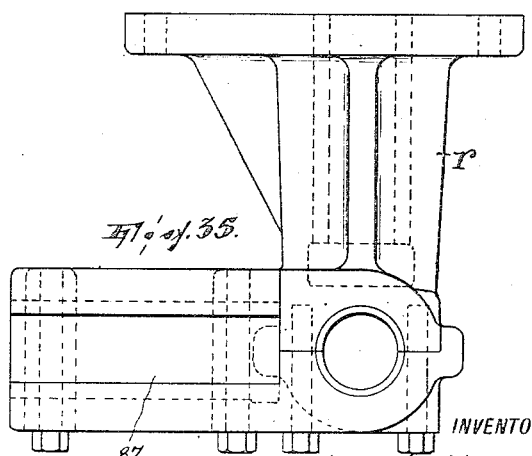

A slide 132 moves vertically in the guideway 133 of the bracket b, having a roller 134 engaged in the camway in the left-hand face (Fig. 2) of the disk x (Figs. 2, 3 and 3ª). In the top of the pedestal c are fulcrumed two levers 135 and 136 whose rearward ends (Fig. 3) are pivotally attached to sleeves 135' and 136' movably arranged on rods 137 and 138 between adjustable spaced nuts 137', 138' on said rods, springs 139 and 140 being coiled about the rods between the sleeves and the lower nuts; the rods are pivotally connected to said slide. If the movement of either lever 135, 136 is opposed the described means for transmitting motion thereto from cam disk x may yield. The lever 135 is pivoted at its forward end on pin 73 of the syrup dispenser. The lever 136 is adapted at its forward end to impinge downwardly against and so actuate lever 131 to open valve 115. Engaged in the ways 130 of the spindle 109—110 are rollers 141 at the forward forked end of a lever 142 fulcrumed in the top of the pedestal c. This lever is connected at its rear end with a slide 143 movable vertically in the bracket r (Figs. 2, 6 and 7) and having a roller 144 engaged in the cam-way in the left-hand face of the cam disk w, the connection 145 (Fig. 2) being yielding and otherwise substantially identical to that between each lever 135, 136 and the slide 132 and therefore not requiring detailed description. Lever 142 has an upstanding crank 146 which, if the working oscillation of said lever is not stopped by the actual presence of a bottle at the position for receiving the filling liquid, obstructs the working oscillation of the lever 136 (by engaging a notched block 147 on the latter) so that the latter fails to accomplish the opening of the valve 115.

The actuation of the valve 129 is effected from a collar 148 (fixed on rod 138) through the medium of a lever 149.

The operation, stated generally, is as follows: Each time two bottles are brought by the turret 19 to the syrup-dispensing and filling-liquid-receiving positions there occur, first, the forming of a sealed union between the bottle at the liquid-filling position and the spindle 109—110; then the opening of the valve 115 to admit the filling-liquid to this bottle and the accompanying discharge to the other bottle of its quantum of syrup; then the closing of said valve and the upward movement of the syrup-dispenser; then upward movement of the spindle away from the corresponding bottle head sufficiently to admit a closure between them; then the introduction of such closure between the spindle and bottle head; then the rise of the latter bottle until by pressing the closure against the spindle the cork lining of the closure seals the bottle mouth; then the opening to the atmosphere of the sealed space formed about the bottle mouth for the release of the gas (air and gas) driven from the bottle into chamber 125 by the entering filling liquid, and the elevation of the bottle, spindle and interposed closure, to effect the attachment of the closure to the bottle head by contraction thereof in the sealing throat 101, and finally the downward movement of the spindle 109—110 with the bottle elevating means to eject the bottle from the throat and gasket 103, leaving the lower end of the spindle somewhat below the level of ring 102.

The cams $u'$, $v$, $w$, $x$ and $u''$ are shown in Figs. 37 to 40 in those positions, relatively to the rollers 43, 88, 144, 134 and 53' respectively actuated thereby, which correspond to the inception of a cycle of operation of the machine, i. e., the positions where the bottle elevating means and spindle (actuated by cams $u'$ and $w$, respectively) are fully depressed, and the means for forming a sealed space around the bottle mouth and placing the closure over the latter (actuated by cam $v$), and the means for depressing the syrup dispenser and opening the valve 115 (actuated by cam $x$) are fully retracted.

While the cams are moving through their quadrants I—II indicated thereon in Figs. 37 to 40, the following operations take place: A bottle has been deposited by the turret 19 on the bottle elevating means and another bottle under the syrup-dispenser. The spindle 109—110 under the influence of cam $w$ rises until its lower end assumes about the position indicated in Fig. 22, within the gasket 103; almost immediately the bottle-elevating means under the influence of the cam $u'$ forces the bottle head upwardly against the spindle. Upon the bottle impinging against the spindle cam $u''$ strikes roller 53' of the bottle-elevating means and momentarily converts the positive grip thereof into a slip-friction grip; compensation thus occurring until the container-thrust-assuming member 37—38 assumes in its carrier (slide 42) a definite distance from the spindle the positive grip is restored and remains active throughout the pending cycle. When roller 88 runs down the incline shown at point I on cam $v$, lever 89 (Fig. 20) moves and advances the slide 81 sufficiently to the right to cut off the chute $h$ and somewhat advance in passage 80' the closure at the bottom of the closure-line, and when it moves down the incline at point II the lever moves again to the right and through lever 90 and block 80 on the one hand and connection 106 and ring 104 on the other effects contraction of gasket 103 into gripping relation to the impinging portions of the spindle and bottle mouth, so that the joint between them is sealed and a space is formed, including that of the bottle, receiver 125 and the connection between them, that is effectually sealed off from the atmosphere, and the aforesaid closure is advanced by the slide to the position 78'. When roller 134 runs up the incline next after point I of cam $x$ it causes the front ends of the levers 135—136, connected with the slide through the yielding connection described, to be depressed somewhat; when, following a pause, the roller mounts the next incline (approaching point II) the levers are depressed again. This forces the syrup-dispenser against the bottle therebeneath, to effect delivery of the syrup charge, and, provided there is a bottle at the liquid-filling position, causes lever 136 to rock lever 131 and so open the valve 115, so that the filling-liquid enters the bottle; if there is no bottle at the liquid filling position lever 142 will not be prevented (as it otherwise would be by the bottle, the required yield occurring in the described yielding or cushion connection between lever 142 and slide 143) from responding momentarily to the depressing influence of a hump at point II on cam $w$ and so shifting crank 146 into the path of downward movement of block 147 on lever 136 (the pause above mentioned giving the crank time to assume this position if required), so that lever 136 is arrested before it engages lever 131 and delivery of filling liquid does not occur; it will be understood that when lever 136 is thus arrested the necessary yield occurs in the yielding connection or cushion afforded by parts 138, 138', 140 and 136'. So far as I am aware it is new to control the liquid-flow-controlling means in a machine of this character by a detecting means moving at regular intervals and adapted to accomplish its control by virtue of presence or absence of a bottle at the filling position to obstruct or fail to obstruct its movement.

While the cams are moving through their quadrants II—III no change occurs.

While the cams are moving through their quadrants III—IV the following operations occur: Roller 134 runs down the incline between points III and IV of cam $x$ and effects partial reverse movement of the levers 135—136, so that the syrup-dispenser is somewhat elevated and valve 115 is closed. (During the period the valve was open the filling liquid, under the required pressure, flowed into the bottle, driving the gas content, i. e., air and it may be some carbonic acid gas, of the bottle through passage 122 into receiver 125 until the pressure therein and that forcing the liquid into the bottle balanced each other—a condition which may be made to correspond to the "full" state of the bottle by adjusting the piston of the receiver. In the filling, the liquid enters the bottle vortically, due to the screw 118, and the gas content, escaping through the passage of the liquid vortex, passes to the receiver, preferably under a condition of retardation determined by adjusting the valve 120, with the object and result of reducing agitation and consequent foaming, all as set forth in my application Serial Number 5,852, in which the method here involved has been fully described and claimed). Next, roller 144 runs down the incline at point IV of cam $w$, so that the spindle is elevated sufficiently to admit the closure between it and the bottle head. The sealed joint between the spindle and bottle head, maintained up to this point by the gasket 103, has prevented any short-circuiting of the pressure, allowing it to reach the receiver only by way of passage 122—under the control afforded by valve 120.

While the cams are passing through their quadrants IV—I the following operations occur: Roller 88 runs down the incline at point IV of cam $w$, so that lever 89 causes slide 81 to place the closure upon seat 78, over the bottle head. Next, roller 144 traverses the descent-incline of cam $w$ between points IV—I and roller 43 the ascent-incline of cam $u'$ between points IV—I thereof. The bottle and spindle now rise, but owing to the superior salience that the now-acting part of cam $u'$ has relatively to the corresponding part of cam $w$ the bottle overtakes the spindle and its mouth comes to bear against the soft or yielding (cork) lining of the closure, marking the inception of the hermetic sealing of the bottle by means of such closure, the spring in the yielding means 145 opposing the necessary pressure for the purpose. Immediately thereafter roller 134 runs down the incline of cam $x$ between points IV—I, so that levers 135—136 resume their starting positions, which has the effect of forcing the collar 148 on rod 138 against lever 149 and causing "snifting," i. e., the discharge of the gas content of the receiver from its nozzle 128; this is at once followed by the opening to the atmosphere of the space sealed off by the gaskets 82 and 103, effected from roller 88 as it traverses the ascent-incline of cam $v$ between points IV—I. Meanwhile the bottle and spindle, holding the closure compressed between them, continue to rise, so that the closure is forced up through the sealing throat 101 and contracted into locking engagement with the locking shoulder at the bottle head, the gasket 103 offering no obstruction because it is now expanded. Finally, roller 43 traverses the descent-incline of cam $u$ (between points IV—I), while roller 88 continues to mount the corresponding ascent-incline of cam $v$, so that as the bottle descends with the elevating means, the spindle follows to eject the bottle-head from the sealing throat and gasket 103 and the lever 89 returns the slide 81 to its starting position. This completes one cycle of the operation.

As explained, absence of a bottle at the filling-liquid delivery position is not accompanied by discharge of filling liquid because in that event when the hump at II of cam $w$ is traversed by roller 144 there is nothing to prevent a limited downward movement of the spindle, so that the crank 146 obstructs the movement of lever 136 necessary to actuate lever 131 and so open valve 115. Absence of a bottle at the syrup-dispensing position of course is not accompanied by syrup discharge because the syrup dispenser cannot function unless a bottle is present; but it should not, also, be accompanied by delivery of a closure to the passage 80', lest when a bottle does appear at the syrup-dispensing position and goes forward to the filling-liquid delivery position there be more than one closure in passage 80', which of course would cause a jam. Spring pressed lever 94 normally holds gate 92 in obstructing relation to the lowermost closure in the chute, and when at the end of the cycle the slide 81 retracts to its starting position no closure will enter passage 80' unless on its previous forward stroke there was a bottle present at the syrup-dispensing position to cause the detector-lever 96 to move the lever 94 until it was locked back by the latch 97, in which case, the closure-line being unobstructed, its weight will force the lowest closure (Fig. 20) into the passage, whereupon as the syrup-dispenser approaches its highest position the arm 99 will elevate the latch through pitman 98 and the closure-column will be again supported by the gate, backed by the spring-pressed lever 94; if no bottle was present on the previous forward stroke of the slide (downward stroke of the syrup dispenser) to cause the locking back of lever 94, the gate on the return stroke of the slide will prevent delivery of a closure to the passage 80', and when the slide performs its next forward or right-hand stroke, as there is present at the filling-liquid position no bottle to be filled so there will be no closure supplied to seat 78.

Having thus fully described my invention, what I claim as new and desire to secure by Letters Patent is:—

1. Coacting pressure-exerting means movable one toward the other, one of said means including members of which one is yieldable in the other in the direction of the working thrust and one has a yield-opposing friction-grip on the other, in combination with means to cause the member having such grip to relax its grip during the working thrust.

2. Coacting pressure-exerting means movable one toward the other, the movable means including members of which one is yieldable in the other in the direction of the working thrust and one has a yield-opposing grip on the other, in combination with a moving actuator for said movable means controlling said grip.

3. Coacting pressure-exerting means movable one toward the other, one of said means including members of which one has a yield-opposing grip on the other, in combination with a moving actuator for the movable means controlling said grip.

4. Coacting pressure-exerting means movable one toward the other, the movable means including members of which one is yieldable in the other in the direction of the working thrust and one has a yield-opposing grip on the other, in combination with a rotary actuator for said movable means controlling said grip.

5. Coacting pressure-exerting means movable one toward the other, one of said means including members of which one has a yield-opposing grip on the other, in combination with a rotary actuator for the movable means controlling said grip.

6. Coacting pressure-exerting means movable one toward the other, one of said means including relatively movable members of which one has a wedge grip-device operative on the other member, and a moving actuator for the movable means controlling said grip-device.

7. Coacting pressure-exerting means movable one toward the other, one of said means including a container-thrust-assuming member, a carrier member for the container-thrust-assuming member, and a grip device arranged in one of said members and normally gripping the other, in combination with means for moving said device out of gripping relation to the member gripped thereby.

8. Coacting pressure-exerting means movable one toward the other, one of said means including a container-thrust-assuming member, a carrier member for the container-thrust-assuming member, and a wedge normally binding said members together, in combination with means for controlling the wedge.

9. In combination, the frame, a container support arranged therein, a cylinder to receive and thereupon deliver a liquid charge, a piston in the cylinder, and an actuator for the piston movable toward and from said support, said support being adjustable in the frame and the piston being adjustable in the actuator longitudinally of the thrust of the piston.

10. In combination, means to support a container, means, movable toward and from the container, for supplying a liquid thereto, means for thereupon supplying and then applying a closure to the container, a container-detector movable in and with the liquid supplying means, and means, controlled by the detector for controlling the third-named means.

11. In combination, coacting pressure means including means for supplying liquid to one container and means for closing another during a single thrust of said pressure means, and means for controlling the closing means projecting into container-controlled relation to the liquid-supplying means.

12. In combination, coacting pressure means including means for supplying liquid to one container and means for applying a closure to another container during a single thrust of said coacting means, means for supplying closures to the closure-applying means, and means for controlling the closure-supplying means projecting into container-controlled relation to the liquid-supplying means.

13. In combination, opposed pressure means including side by side a liquid-supplying means and a container closing means, rotary means journaled on an axis parallel to the thrust line of said pressure means to advance a line of containers between the opposed pressure means and each first to the liquid-supplying means and then to the container closing means, and means to alternately actuate the pressure and advancing means.

14. In combination, rotary means to advance containers in a line, a presure-exerting structure movable toward and from the containers and including a liquid-supplying means and a container closing means arranged one ahead of the other relatively to said line, the first-named means being rotary on an axis parallel to the thrust line of said structure, and means to alternately actuate said advancing means and structure.

15. In combination, with means to supply liquid to the containers including a liquid-flow-controlling means, a container-controlled detecting means controlling the liquid-flow-controlling means, and means to move the detecting means at regular intervals, means to support a container in controlling relation to the detecting means.

16. In combination, with means to supply liquid to the containers including a liquid-flow-controlling means, a container controlled detecting means controlling the liquid-flow-controlling means, and means to move the detecting means at regular intervals, means to support a container in controlling relation to the detecting means, said detecting means having a part thereof affording the outlet of the first-named means.

17. In combination, with means to supply liquid to the containers including a liquid-flow-controlling means, a container-checked detecting means controlling the liquid-flow-controlling means, and means to move the detecting means at regular intervals, means to support a container in movement-checking relation to the detecting means.

18. In combination, with means to supply liquid to the containers including a liquid-flow-controlling means, a cushion-including container-controlled detecting means controlling the liquid-flow-controlling means and means to move the detecting means at regular intervals, means to support a container in movement-controlling relation to the detecting means.

19. In combination, with means to supply liquid to the containers including a liquid-flow-controlling means, a cushion-including container-checked detecting means controlling the liquid-flow-controlling means, and means to move the detecting means at regular intervals, means to support a container in movement-checking relation to the detecting means.

20. In combination, with means to supply a liquid to the containers including a moving liquid-flow-controlling means having normally a definite range of movement, means to actuate said liquid-flow-controlling means, a moving container-controlled means to obstruct the movement of the liquid-flow-controlling means, and means to move the container-controlled means at regular intervals, means to support a container in movement-controlling relation to said means.

21. In combination, with means to supply a liquid to the containers including a moving cushion-including liquid-flow-controlling means having normally a definite range of movement, means to actuate said liquid-flow-controlling means, a moving container-controlled means to obstruct the movement of the liquid-flow-controlling means, and means to move the container-controlled means at regular intervals, means to support a container in movement-controlling relation to said means.

22. In combination, a container-controlled detecting means including a liquid delivery member, means to move the detecting means at regular intervals, means to support the container in movement-obstructing relation to the detecting means and a liquid-flow-controlling means controlled by the detecting means.

23. In combination, a cushion-including container-controlled detecting means including a liquid delivery member, means to move the detecting means at regular intervals, means to support the container in movement-obstructing relation to the detecting means and a liquid-flow-controlling means controlled by the detecting means.

24. In combination, a supporting structure, a yielding container-height-compensating container support, an upwardly retractable fluid conducting member, means to elevate the container support, means to hold said member substantially at pause and thereupon move it upwardly from the container support during the rise of the latter, and means to interpose a closure between the container and said member following said pause.

25. In combination, a supporting structure, a longitudinally movable liquid conducting tubular member having a liquid outlet in one end thereof and adapted at said end to receive the impact of the container mouth, a closure-affixing appliance surrounding the axis of said member, and means, also surrounding the axis of said member, to seal the joint between the container mouth and said end of said member.

26. Means to supply liquid to a container having a controllable escape-passage for the gas evicted from the container and its liquid-delivery outlet portion adapted to receive contact of the container mouth, in combination with a hermetic space-forming means into which said passage discharges having means to seal the joint between said portion and the container mouth.

27. Means for forming with the interior of the container a sealed space having a container-admission opening and having a part of said means adapted to receive the impact of the container and movable through said space into and out of sealing relation to said opening.

28. Means to form with the interior of the container a sealed space having means to admit a liquid to said space and having a container-admission opening and a part of said liquid admitting means adapted to receive the impact of the container and movable through said space into and out of sealing relation to said opening.

29. Means to form with the interior of the container a sealed space having a container-admission opening and a part of said liquid admitting means adapted to receive the impact of the container and forming a liquid conductor movable through said space into and out of sealing relation to said opening.

30. In combination, a supporting structure having an upright portion, a rotary bottle turret coaxial with said upright portion and having bottle-receiving spaces, and a supporting means for the bottle turret vertically adjustably arranged on said portion and having a rest underlying the turret and adapted to support the bottles occupying said spaces.

31. In combination, a supporting structure having an upright portion, a rotary bottle turret coaxial with said upright portion and having bottle-receiving spaces, and a supporting means for the bottle turret vertically adjustably arranged on said portion and having a non-rotating rest underlying the turret and adapted to support the bottles occupying said spaces.

32. In combination, a supporting structure, a bottle turret vertically adjustably arranged in said structure and rotative therein on a vertical axis, a rotary driving member journaled in said structure, and means to transmit rotary movement from said member to the turret having vertically sliding connection with one of them.

33. In combination, a supporting structure, a bottle turret vertically adjustably arranged in said structure and rotative therein on a vertical axis, a rotary driving member journaled on a vertical axis in said structure, and a shaft carried by the turret and having a spline-connection with said member.

34. In combination, a supporting structure, a bottle support vertically adjustably arranged in said structure, another bottle support having vertical movement limited by the first-named support, and means to move the second support vertically having a vertically yielding connection therewith.

35. In combination, a supporting structure, a support for the containers vertically penetrating a part of said structure and having lateral movability, and a wiper embracing said support and laterally yieldingly connected with said part.

36. In combination, a supporting structure, a support for the containers vertically penetrating said structure and having lateral movability, said structure having a fixed upstanding portion surrounding said support, a wiper embracing said support, and a yielding sleeve embracing said upstanding portion and the wiper.

In testimony whereof I affix my signature.

AMOS CALLESON.